(12) United States Patent
Berger

(10) Patent No.: US 8,746,181 B2
(45) Date of Patent: Jun. 10, 2014

(54) HELIX-SHAPED DOG CHEW

(76) Inventor: Dean Berger, Oakton, VA (US)

( * ) Notice: Subject to any disclaimer, the term of this patent is extended or adjusted under 35 U.S.C. 154(b) by 144 days.

(21) Appl. No.: 13/289,773

(22) Filed: Nov. 4, 2011

(65) Prior Publication Data

US 2012/0111284 A1     May 10, 2012

Related U.S. Application Data

(60) Provisional application No. 61/411,409, filed on Nov. 8, 2010.

(51) Int. Cl.
*A01K 29/00*     (2006.01)
(52) U.S. Cl.
USPC ............................................ 119/710; 119/709
(58) Field of Classification Search
USPC ........................................ 119/702, 707–711
See application file for complete search history.

(56) References Cited

U.S. PATENT DOCUMENTS

| | | | | |
|---|---|---|---|---|
| 3,198,173 A * | 8/1965 | Fisher | ............................ | 119/709 |
| 4,513,014 A | 4/1985 | Edwards | | |
| 5,647,302 A * | 7/1997 | Shipp | ............................. | 119/709 |
| 5,711,254 A * | 1/1998 | O'Rourke | ....................... | 119/710 |
| D492,467 S | 7/2004 | Pittard et al. | | |
| 6,886,497 B1 * | 5/2005 | Hague | ............................ | 119/710 |
| D514,264 S | 1/2006 | Viola | | |
| 7,025,020 B2 * | 4/2006 | Brown | ........................... | 119/710 |
| D534,706 S | 1/2007 | Cuadrado | | |
| 2006/0107906 A1* | 5/2006 | Weinberg | ........................ | 119/710 |
| 2007/0006818 A1* | 1/2007 | Bidinger | ........................ | 119/709 |
| 2013/0273125 A1* | 10/2013 | Barnvos et al. | ............... | 424/401 |

* cited by examiner

*Primary Examiner* — Rob Swiatek
*Assistant Examiner* — Lisa Tsang
(74) *Attorney, Agent, or Firm* — Richard C Litman

(57) ABSTRACT

The helix-shaped, dog chew that has a helicoidally shaped configuration that is similar to an auger (or Archimedes' screw). The chew is fabricated from an extruded or die-cast, pliable material with the consistency of a firm rubber. The material is edible and non-harmful to animals. The helicoidally shaped configuration allows the chew to make contact with the inner and outer surfaces of the teeth to promote thorough cleaning thereof, and to also massage the gums, thereby greatly reducing the incidence of disease and bleeding.

6 Claims, 4 Drawing Sheets

HELIX-SHAPED DOG CHEW

CROSS-REFERENCE TO RELATED APPLICATION

This application claims the benefit of U.S. Provisional Patent Application Ser. No. 61/411,409, filed Nov. 8, 2010.

BACKGROUND OF THE INVENTION

1. Field of the Invention

The present invention generally relates to pet toys, and more specifically to a helix-shaped dog chew that also functions as a hygienic dental aid for pet dogs.

2. Description of the Related Art

An entire industry has developed to provide a bevy of toys for our beloved pets. The chew toy for dogs (or other pet carnivores) is among the many toys available in the marketplace. Most chew toys resemble a bone in appearance and are fabricated of resilient material. These bone-shaped toys are usually designed to merely provide a diversion for the pet. Other related art chew toys function to provide masticatory exercise for the pet, but fail to provide structure that would promote tooth scaling and tartar removal. Thus, a helix-shaped dog chew solving the aforementioned problems is desired.

SUMMARY OF THE INVENTION

The helix-shaped dog chew has a unique, helicoidally shaped configuration that is similar to an auger (or Archimedes' screw). The chew is fabricated from an extruded or die-cast, hard, pliable material. The material is edible and non-harmful to animals. The unique, helicoidally shaped configuration allows the chew to make contact with the inner and outer surfaces of the teeth to promote thorough cleaning thereof and to also massage the gums, thereby greatly reducing the incidence of disease and bleeding. The chew preferably incorporates a reinforcement core that allows the chew to better withstand the grinding pressures presented thereon by the pet's teeth. The reinforcement core may take on a variety of designs, as further discussed below. As presently contemplated, the chew will be manufactured in various sizes to accommodate small to large pets. The chew is infused throughout with various flavors (beef, chicken, lamb, duck, fish, etc.) to entice and make the experience more satisfying for the pet.

Accordingly, the invention presents a superior chew toy that not only provides diversion but also promotes hygienic health for a pet. The chew toy is fabricated from a hard, pliable, durable, edible material. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
FIG. 1 is an environmental, perspective view of a helix-shaped dog chew according to the present invention.
Figure 2:
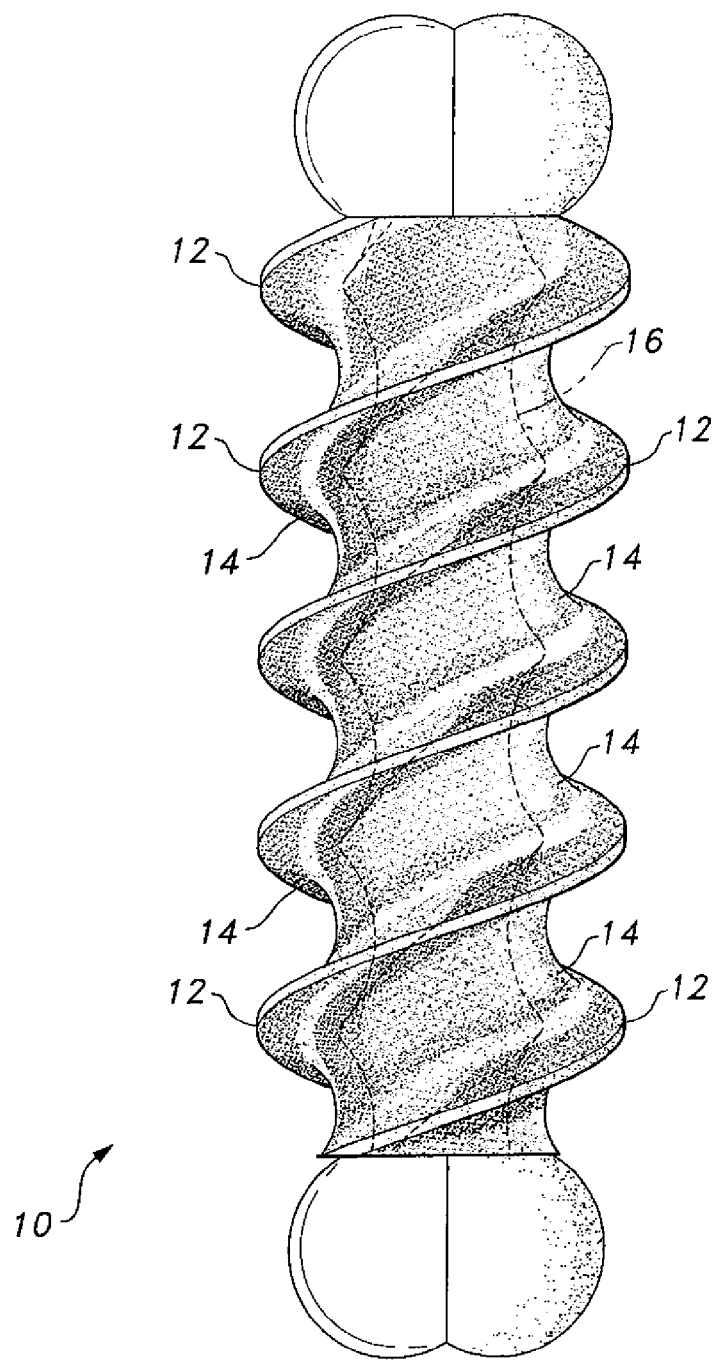
FIG. 2 is a perspective view of a helix-shaped dog chew according to the present invention.

Referring to FIGS. 1 and 2, the helix-shaped, dog chew is generally indicated at 10. The dog chew 10 comprises a helically- or helicoidally-shaped, elongate body having ridges 12 and gnawing channels 14. As indicated above, the body is fabricated from a suitable edible, hard, pliable material. As presently contemplated, but not limited thereto, the overall length of the body ranges from approximately 4" for small dogs i.e. Toy Poodles to approximately 16" for large dogs, e.g., Great Danes. The diameter of the body ranges from 1" to 3.5". The helix angle may vary from 20° to 130° relative to the longitudinal axis of the body. The helix angle design will allow for longer continual contact on the teeth surface of the pet, thus permitting enhanced scraping motions on the surface of the teeth to assist in removing tartar buildup and dental calculus from the teeth's inner and outer surfaces. The helicoidal design extends curvature in all directions, enabling the dog A to easily manipulate the chew using its paws and/or forelegs, and reduces the incidence of slippage from the mouth. As discussed above, the chew can be made in different sizes to accommodate the various sizes of dogs and is infused with various food flavors. The ends of the body may be rounded, if desired, to more resemble a bone.

Technically, a helix is a line wound in a spiral shape, such as a helically wound wire. A helicoid is a plate wound in a spiral shape, such as a spiral ramp, and is sometimes referred to as a "filled-in" helix. The terms "helix-shaped", "helicoid shape", "helically", and "helicoidally" are used interchangeably herein to define the shape of the body of a chew toy having an outer edge that defines a helix and that also has a helical surface, similar to the threads of a screw. The chew toy 10 in FIGS. 1 and 2 is shown to preferably include a helical reinforcement core 16.

Figure 3A:
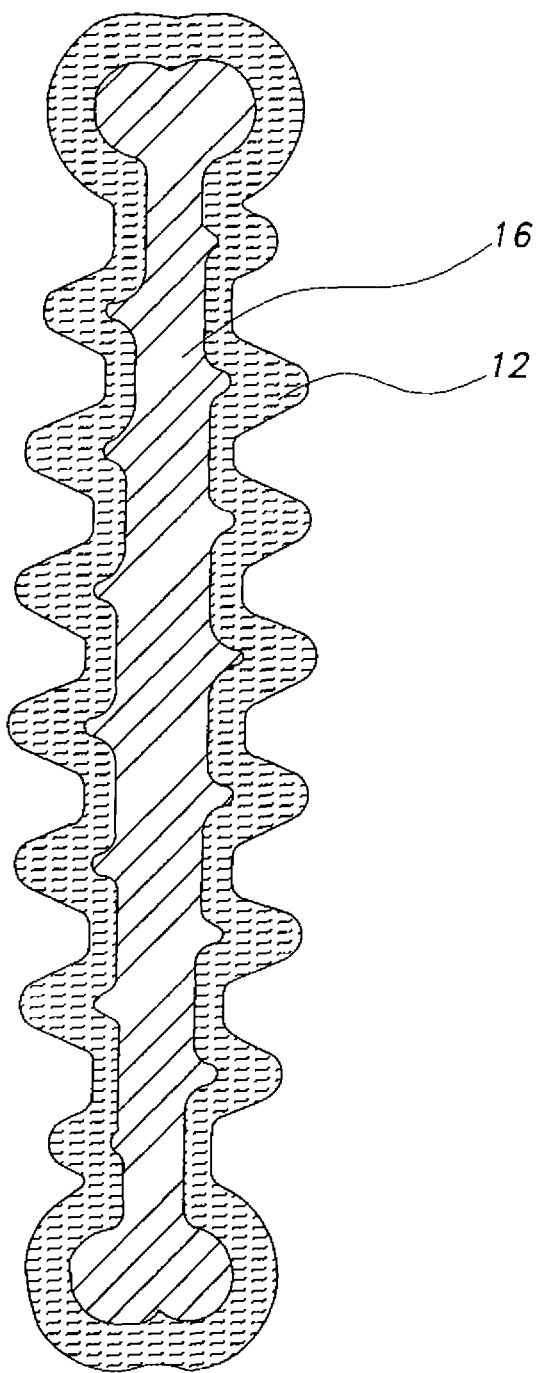
FIG. 3A is a side view in section of the dog chew of FIG. 2, showing the preferred configuration of the reinforcement core.
Figure 3B:
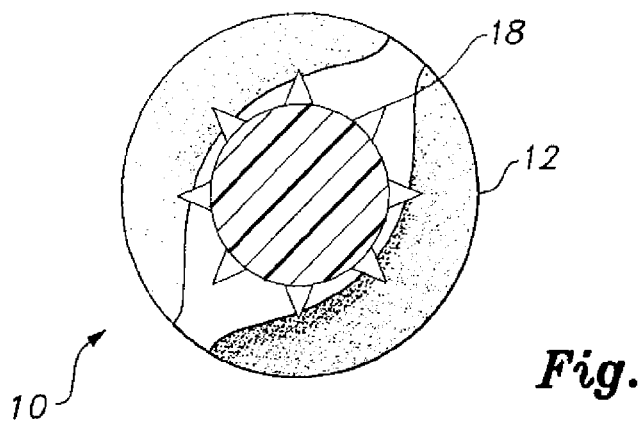
FIG. 3B is a transverse section view of a helix-shaped, dog chew according to the present invention, showing a second embodiment of the reinforcement core.
Figure 3C:
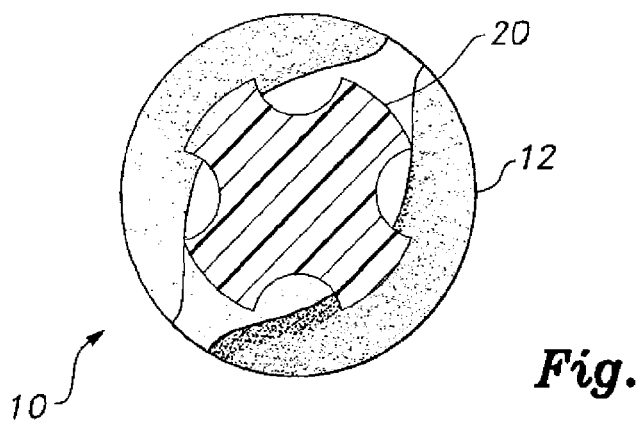
FIG. 3C is a transverse section view of a helix-shaped, dog chew according to the present invention, showing a third embodiment of the reinforcement core.
Figure 3D:
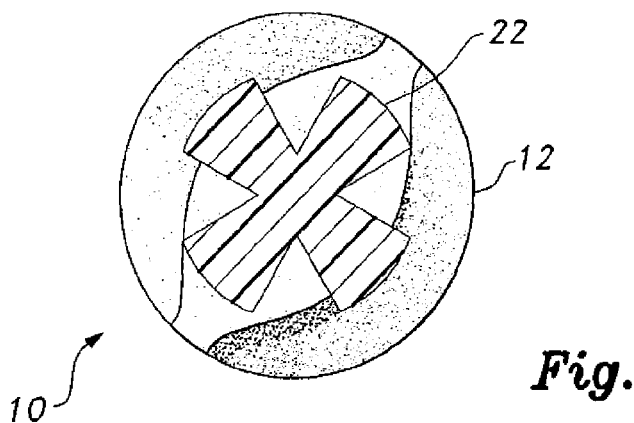
FIG. 3D is a transverse section view of a helix-shaped, dog chew according to the present invention, showing a fourth embodiment of the reinforcement core.

The core member 16 provides reinforcement for the body of the chew member 10. The reinforcement core member 16 is also fabricated from edible material and is also infused with various flavors so that the chewing experience may continue, even after the body has been exhausted. Bovine tripe has proven to be an effective material from which to fabricate the core member. The reinforcement core member 16 is substantially coextensive with the length of the body of chew member 10 and can be made of varied hardness, depending on the size of the chew and the predicted pressure associated with smaller or larger dogs. The reinforcement core member 16 can also be fabricated in different configurations, depending upon projected usage and cost of manufacture. The reinforcement core member 16 of FIGS. 2 and 3A is configured as a double helicoid. This core configuration has proven to be especially durable and effective. It should be noted, however, that other core configurations, examples of which are shown at 18, 20 and 22 (FIGS. 3B, 3C, and 3D), have proven suitable. It should also be noted that the configurations of the core are not limited to those illustrated, and the core may be designed in any suitable configuration.

It is to be understood that the present invention is not limited to the embodiments described above, but encompasses any and all embodiments within the scope of the following claims.

I claim:

1. A chew toy for a pet, comprising:
an elongate body having an outer surface, a length and a longitudinal axis, the body being fabricated from an edible material having sufficient hardness to clean surfaces of the pet's teeth, the outer surface forming a helix extending in the direction of the longitudinal axis, wherein the helix includes a uniform array of ridges and intermittent channels therebetween extending from one end of the elongate body to the other; and
an elongate reinforcement member fabricated from edible material, the elongate reinforcement member being disposed within the elongate body and extending in the direction of the longitudinal axis, the elongate reinforcement member being substantially coextensive with the elongate body and entirely encased therein, the reinforcement member further having a discontinuously-shaped entire outer surface to provide a reinforcing effect to the elongate body member.

2. The chew toy according to claim 1, wherein said body is infused with a food flavoring.

3. The chew toy according to claim 1, wherein said reinforcement member is infused with a food flavoring.

4. The chew toy according to claim 1, wherein the length of said body ranges from 4 to 16 inches.

5. The chew toy according to claim 1, wherein said reinforcement member is fabricated from bovine tripe.

6. The chew toy according to claim 1, wherein the diameter of the body ranges from 1 to 3.5 inches.

* * * * *